Patented Aug. 14, 1945

2,382,464

UNITED STATES PATENT OFFICE 2,382,464

PRODUCTION OF UNSATURATED CARBOXYLIC ACIDS

Albert B. Boese, Jr., Charleston, W. Va., assignor to Carbide and Carbon Chemicals Corporation, a corporation of New York No Drawing. Application January 30, 1942,
Serial No. 428,865

14 Claims. (Cl. 260—526)

This invention relates to the production of unsaturated carboxylic acids, and more especially it concerns the production of such compounds by a process involving the reaction of ketene with ketones having at least one aliphatic, alicyclic or aralkyl group directly attached to the carbon atom of the carbonyl group, in the presence of a catalytic quantity of certain acidic catalysts, and preferably of at least one of the volatile halides of the trivalent metals such as boron trifluoride, aluminum chloride and ferric chloride. While boron trifluoride is outstandingly effective for catalyzing the reaction between ketene and these ketones with the formation of unsaturated acids, other halides of this group, and mixtures of boric acid with aliphatic and aromatic acids such as oxalic and salicylic acids, may be effectively employed but with somewhat lower yields of the desired products. The materials useful in catalyzing the reaction between ketene and the ketone may be designated in general as strong acidic condensing agents selected from the group consisting of the volatile metallic halides of the trivalent metals and condensing agents containing an acidic boron compound.

Previous attempts to react ketene with ketones in the presence of various catalysts such as sodium acetate, mineral acids and organic tertiary amines for the production of unsaturated organic acids have been uniformly unsuccessful, the reaction products in every case being polymers of ketene. Moreover, ketene has been found to be unreactive with ketones in the vapor phase in the presence of each of a large variety of catalysts at temperatures as high as 400° C. Thus, when the vapors of ketene and acetone were passed over such catalysts as activated alumina, activated carbon, and silica gel, at temperatures ranging between 150° C. and 400° C., no trace of acidic addition products could be isolated.

This invention is based in important part upon the discovery that, when ketene or a gas containing the same, such as the gases formed by the thermal decomposition of acetone, is contacted with a ketone having at least one aliphatic, alicyclic or aralkyl residue directly attached to the carbon atom of the carbonyl group, in the presence of an acidic condensing agent of the type herein described, rapid reaction occurs; and the resultant reaction product, on further treatment, yields an unsaturated organic acid. By further rearrangement a small quantity of beta, gamma-unsaturated acid may be produced.

The actual mechanism of the reaction is not entirely understood. It is believed that the initial reaction involves the addition of ketene to the carbonyl group of the ketone to form a polymeric beta-lactone which, under the influence of a catalyst of the type described, breaks up, with rearrangement, giving an unsaturated acid.

In the preferred practice of the invention, gaseous ketene, or a gaseous or vaporous mixture containing ketene, is passed through an excess of the ketone to which a catalytic amount of the acidic catalyst has been added. The catalyst generally is used in amounts ranging from around 0.1% to 1.0% based upon the weight of the total reactants. Either or both the ketene and ketone can, if desired, be diluted with a solvent that is inert to the reactants. The reaction is exothermic, and the reaction mixture preferably is cooled to maintain it at a temperature within the range between −30° C. and 40° C. to facilitate complete absorption of the ketene. Higher temperatures can be used, depending upon the efficiency of the absorption system. If desired, the ketene and ketone can be slowly added concurrently to a solution or suspension of the catalyst in the ketone or in an inert solvent for the reactants.

Generally when the ketene has reacted in approximately the ratio of one mole of ketene to around two to four moles of the ketone, the reaction is discontinued, and the excess ketone is removed in suitable manner, as by distillation at atmospheric pressure or under vacuum. Afterwards the reaction product, in the case of the lower ketones such as acetone, can be fractionally distilled. In the case of higher ketones it often is preferred to neutralize the crude reaction product, as by introducing it slowly into a suitable quantity of a 15% to 25% aqueous solution of sodium hydroxide. The aqueous layer is then separated and is acidified with a mineral acid such as sulfuric or hydrochloric acids. The unsaturated organic acids thus separated from the mixture are extracted with a suitable solvent such as ethyl ether; aromatic hydrocarbons such as benzene and toluene; and the chlorinated hydrocarbons. After removal of such solvent from the resultant extract, the unsaturated acids may be further purified by distillation under vacuum, or in other suitable manner.

If desired, the ketene-ketone condensation product can be subjected to an esterification treatment with an alcohol such as methanol or ethanol or other lower alcohol, and the unsaturated acid present therein isolated in the form of the corresponding methyl, ethyl or other ester.

As a source of ketene there can be employed the gaseous products of the pyrolysis of acetone from which unreacted acetone has been removed by condensation; or ketene generated by the thermal decomposition of diketene may be employed.

As previously indicated, the activity of boron trifluoride in catalyzing the reaction between ketene and ketones for the production of unsaturated organic acids far exceeds that of the other acidic catalysts indicated. When using boron trifluoride it is generally preferred to introduce it into the reaction mixture or into the ketone in the form of its ethyl ether complex (the reaction product of boron trifluoride with the ether), in which form it is less readily removable from the sphere of reaction by vaporization.

The following examples serve to illustrate the invention:

Example 1

Over a period of 8 hours crude gases containing 369 grams of ketene, resulting from the thermal decomposition of acetone, were diffused through 2 gallons of acetone containing 2 grams of boron trifluoride added in the form of a 25% solution in ethyl ether. During the reaction the temperature was maintained at approximately 20° C. After removing excess acetone the residue was fractionated under vacuum, yielding 686 grams of a partially crystalline distillate distilling at between 60° and 66° C. at a pressure of 2 mm. of mercury, absolute, representing a yield of over 78%, based upon ketene. 2 liters of water at 10° C. were added to this acid mixture, and the resulting crystalline mush was filtered, yielding a large quantity of pure dimethyl acrylic acid as colorless crystals melting at 69°–70° C. After removing water from the filtrate, there was obtained a somewhat smaller amount of isopropenyl acetic acid as a colorless liquid boiling at 184°–185° C. at 20 mm. of mercury absolute pressure; and having a specific gravity at 20°/20° C. of 0.9816; and a refractive index at 20° C. of 1.4410.

Example 2

Over a period of 65 minutes ketene, generated by the pyrolysis of diketene, was passed into 1425 grams of methyl amyl ketone containing 0.6 gram of boron trifluoride until 151 grams of ketene had been absorbed. During this time the temperature was kept between 10° and 20° C. by cooling. After standing at room temperature for 18 hours the excess methyl amyl ketone was stripped off, and the residue fractionated under vacuum. There was thus obtained a yield of over 81% of methyl amyl acrylic acid in the form of a colorless somewhat viscous liquid boiling at 108° C. under an absolute pressure of 1 mm. of mercury; having a specific gravity at 20°/20° C. of 0.9347; and a refractive index at 20° C. of 1.4522. It is insoluble in water but soluble in the common organic solvents such as methanol, ethanol, acetone, ether, and the chlorinated hydrocarbons.

If desired, the residue, after removal of excess methyl amyl ketone, can be neutralized by adding it to a refluxing aqueous solution of sodium hydroxide, after which the resulting solution is cooled, acidified, extracted with ethyl ether and, after removing the ether, the residue distilled under vacuum. β-methyl β-amyl acrylic acid then can be recovered as the fraction boiling at 113°–114° C. under a pressure of 2 mm. of mercury.

Example 3

40 grams of ketene were reacted with 200 grams of diisobutyl ketone containing 0.4 gram of boron trifluoride, while maintaining the temperature of the mixture between 10° and 20° C. The excess ketone was distilled off, and the residue was neutralized by adding it to a refluxing 20% aqueous solution of sodium hydroxide. The resulting solution was cooled, acidified with hydrochloric acid and extracted with ether. After removal of the ether, the residue was distilled under vacuum. The fraction boiling between 116° and 118° C. under 2 mm. of mercury, absolute pressure, was a colorless oily liquid, and consisted of diisobutyl acrylic acid, as shown by tests of unsaturation, molecular weight and neutralization equivalent. This compound has a structure designated by the formula

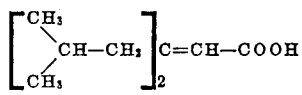

Example 4

Following the general procedure set forth in Example 3, 58 grams of ketene were reacted with 300 grams of cyclohexanone containing 0.4 gram of boron trifluoride. After treating the reaction mixture in the manner set forth in Example 3, upon fractionally distilling the residue resulting from removal of ether from the ether extract, a fraction boiling between 105° and 106° C. under 2 mm. of mercury, absolute pressure, crystallized on cooling and was identified as cyclohexylidene acetic acid.

Example 5

Ketene was passed into 500 grams of dihydroisophorone containing 0.6 gram of boron trifluoride and maintained at temperatures ranging between 0° and 10° C. until 118 grams of ketene had been absorbed. Distillation of the reaction mixture under vacuum yielded a quantity of dihydroisophorone, together with an acidic fraction distilling between 60° and 150° C. under an absolute pressure of 2 mm. of mercury. This fraction was treated with an excess of an aqueous solution of sodium hydroxide, and the caustic insoluble material was extracted with toluene. After acidification, the organic acid which precipitated from the caustic solution was extracted with toluene and, after stripping off the toluene, was fractionated under vacuum, thereby yielding a large quantity of a colorless liquid distilling at 128° C. under 1 mm. of mercury, absolute pressure, and identified as 1,1,3-trimethyl cyclohexylidene acetic acid.

Example 6

Over a period of 25 minutes, 52 grams of ketene were absorbed in 191 grams of acetone containing 1.8 grams of aluminum chloride, while keeping the temperature within the range between 0° and 20° C. When the reaction was complete, the acetone was stripped off, leaving a residue that, upon fractional distillation under vacuum, yielded an important quantity of isopropenyl acetic acid distilling at 70°–71° C. under 4 mm. of mercury, absolute pressure.

Example 7

Under conditions substantially identical with those recited in Example 6, but employing a boric acid-oxalic acid catalyst in place of aluminum chloride, a slightly lower yield of isopropenyl acetic acid was obtained. This catalyst was made by heating at 130° C. for a few minutes equi-molecular quantities of boric acid and anhydrous oxalic acid. After cooling, the crystalline mass was ground to a fine powder.

A boric acid-salicylic acid mixed catalyst found suitable for use in the process may be produced in similar manner by substituting salicylic acid for the oxalic acid.

Example 8

Ketene was passed through 200 grams of acetophenone containing 0.1 gram of boron trifluoride until 21 grams (0.5 mole) had been absorbed, while maintaining the temperature of the mixture between 20° and 30° C. The excess acetophenone was distilled off, and the residue was neutralized by adding the same to a refluxing 5% aqueous solution of sodium hydroxide. The mixture was acidified with hydrochloric acid, extracted with ether and, after removal of the ether, the residue was distilled under vacuum. The fraction boiling between 140° and 170° C. under 4 mm. of mercury, absolute pressure, was again treated with dilute caustic solution, and the caustic insoluble portion extracted with ether. The aqueous layer was then acidified and extracted with ether. Distillation of the ether extract yielded a large quantity of crystalline beta-methyl cinnamic acid. The latter was separated, by fractional crystallization from petroleum ether, into two stereoisomers, one a high-melting form which melted at 127°–129° C., and the other a low-melting form which melted at 89°–90° C.

Example 9

280 grams of a nine-carbon unsaturated ketone, 2-ethyl-heptene-3-one-5, and 80 grams of ketene were fed simultaneously to 200 grams of toluene containing 2 grams of boron trifluoride, while maintaining the mixture at a temperature within the range between 0° and 20° C. After removal of the toluene the product was distilled under vacuum, yielding a pale yellow liquid acid boiling between 135° and 140° C. under 3 mm. of mercury, absolute pressure, and which apparently has a structure corresponding to the formula

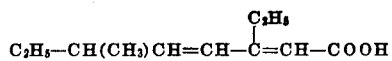

Example 10

Over a period of 15 minutes 171 grams of heptadecenone and 29 grams of ketene were reacted by simultaneous addition to a solution of 2 grams of boron trifluoride in 350 grams of toluene maintained at −10° C. After standing overnight, toluene was stripped from the solution, and the residual liquid was washed several times with water and was fractionally distilled under vacuum, thereby providing a good yield of crude nondecadienoic acid as a yellow liquid distilling between 170° and 178° C. under 1–1.5 mm. of mercury, absolute pressure.

The unsaturated organic acids produced in accordance with this invention may find applications in fields where saturated acids of similar molecular weight are now utilized. Furthermore, the presence of a double bond in the molecule indicates the suitability of these organic acids for use as intermediates for the preparation of other compounds by treatment thereof with such agents as the halogens, the halogen acids, hypohalites, ammonia, and the amines. The esters of the higher unsaturated acids appear to have value as solvents and plasticizers for various synthetic resins and the like; while the esters and nitriles of the lower unsaturated acids are of interest in connection with the formation of polymers and copolymers thereof.

By the term "alkyl," "cycloalkyl" and "aralkyl" appearing in the accompanying claims I intend to designate aliphatic and substituted aliphatic radicals derived from unsaturated hydrocarbons as well as those derived from saturated hydrocarbons.

I claim:

1. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of an acidic condensing agent selected from the group consisting of the volatile halides of trivalent metals and acidic boron compounds.

2. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of an acidic boron-containing condensing agent.

3. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of boron trifluoride.

4. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of aluminum chloride.

5. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of ferric chloride.

6. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of a mixture of boric acid with an organic acid.

7. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of a volatile halide of a trivalent metal, while maintaining the temperature of the reaction mixture within the range between −30° C. and 40° C.

8. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of an acidic condensing agent comprising a volatile halide of a trivalent metal, and fractionally distilling under vacuum from the resultant reaction mixture the unsaturated carboxylic acid thus produced.

9. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of an acidic condensing agent comprising an acidic boron compound, and fractionally distilling under vacuum from the resultant reaction mixture the unsaturated carboxylic acid thus produced.

10. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of boron trifluoride, and fractionally distilling under vacuum from the resultant reaction mixture the unsaturated carboxylic acid thus produced.

11. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of aluminum chloride, and fractionally distilling under vacuum from the resultant reaction mixture the unsaturated carboxylic acid thus produced.

12. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of a mixture of boric acid and an organic acid, and fractionally distilling under vacuum from the resultant reaction mixture the unsaturated carboxylic acid thus produced.

13. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of a volatile halide of a trivalent metal.

14. Process of producing an unsaturated carboxylic acid, which comprises reacting ketene and a ketone having directly attached to the carbon atom of the carbonyl group at least one radical selected from the class consisting of alkyl, cycloalkyl and aralkyl radicals, in the presence of an acidic boron-containing condensing agent, while maintaining the temperature of the reaction mixture within the range between $-30°$ C. and $40°$ C.

ALBERT B. BOESE, Jr.